Figure 1:
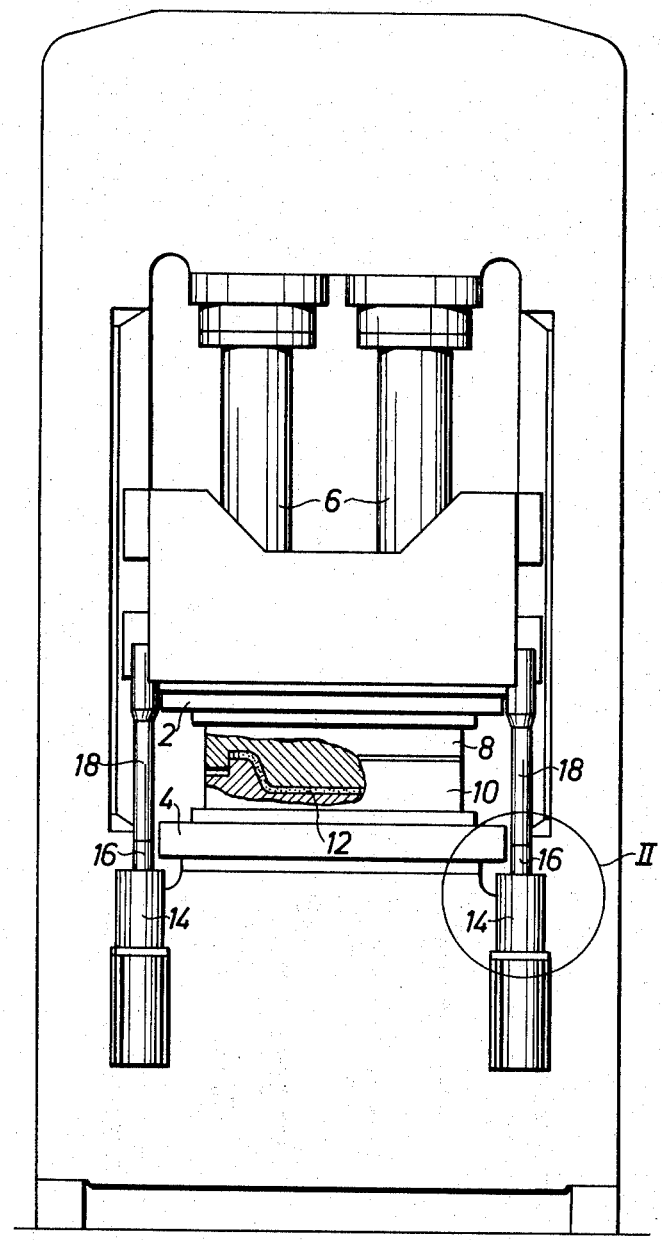

United States Patent [19]
Fjellman

[11] 3,799,720
[45] Mar. 26, 1974

[54] COMPRESSION MOULDING PRESS

[76] Inventor: Rune Axel Erik Fjellman, Box 7, 542 01 Mariestad, Sweden

[22] Filed: Sept. 19, 1972

[21] Appl. No.: 290,417

[52] U.S. Cl.................. 425/157, 425/355, 425/406
[51] Int. Cl. .............................................. B29c 3/06
[58] Field of Search .......... 425/156, 355, 406, 157; 100/269

[56] References Cited
UNITED STATES PATENTS
| | | | |
|---|---|---|---|
| 1,269,769 | 6/1918 | Whitney | 425/355 |
| 2,724,145 | 11/1955 | Hall | 425/157 |
| 3,733,154 | 5/1973 | Smith et al. | 425/406 X |

*Primary Examiner*—Robert L. Spicer, Jr.
*Attorney, Agent, or Firm*—Walter Becker

[57] ABSTRACT

The invention relates to a compression moulding press of the kind wherein the object to be compression moulded is subjected to the total compression moulding pressure during the time the mould is closed. This is done by first bringing the parts of the moulds, during the compression moulding process, to a standstill in a predetermined position. After a predetermined time, when the curing has attained a certain state, the parts are again brought into contact with the compression moulding object. In the press used one of the two press platens operating the parts of the mould, at the side thereof directed towards the other platen, comprises hydraulic cylinders, wherein pistons are moveable substantially perpendicularly relative the platens. Said pistons determine the distance between the platens in cooperation with stationary abutments on the second platen, and said predetermined position of the parts of the mould corresponds to a first predetermined piston position, to which the movement of the pistons outwardly of the cylinders is restricted. According to the invention means are arranged for allowing and causing movement outwardly of the pistons beyond said first piston position, after the termination of the compression moulding operation.

In one embodiment the position of the pistons is limited by an internal abutment, which is axially movable in the corresponding cylinder between a first abutting position, wherein it defines the first piston position, and a second, external abutting position, which defines a second piston position, to which the piston is movable outwardly beyond the first piston position.

4 Claims, 4 Drawing Figures

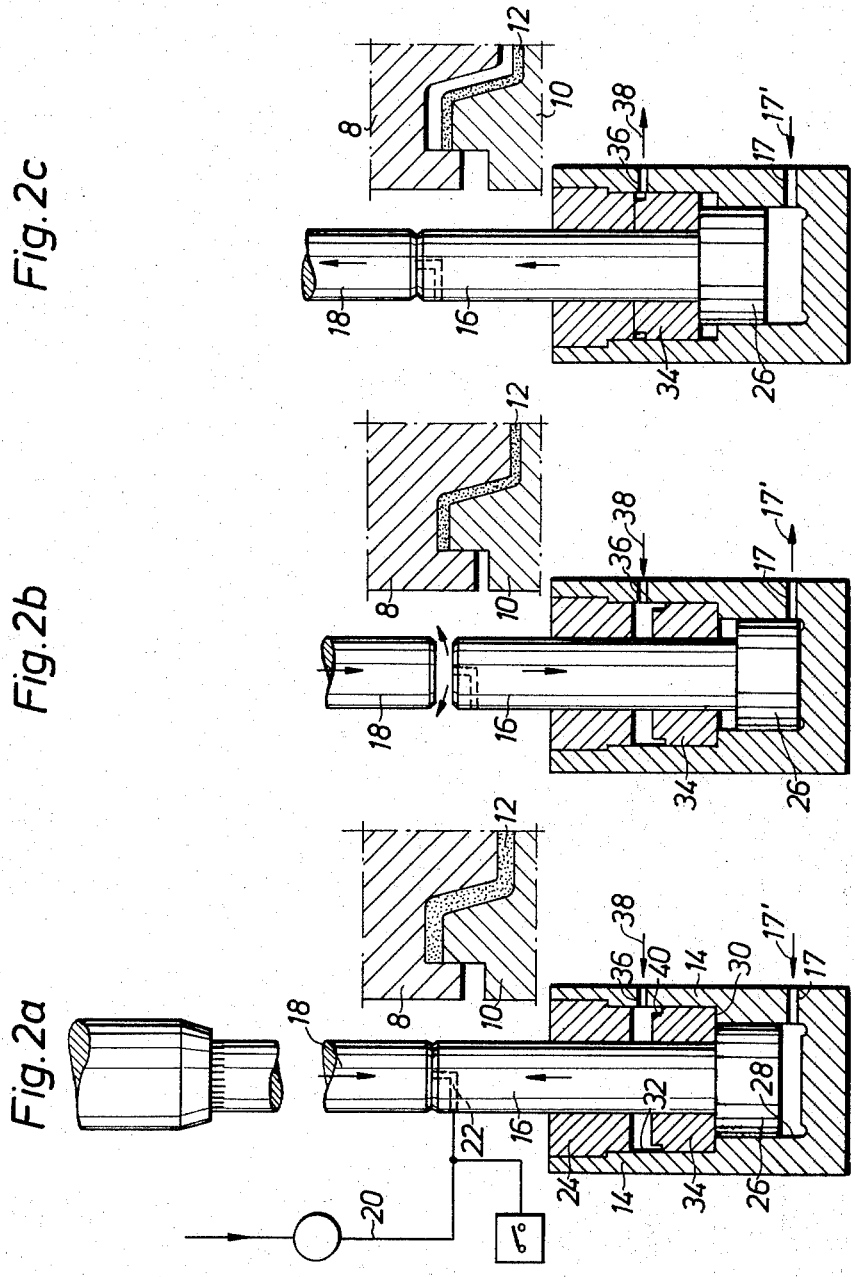

COMPRESSION MOULDING PRESS

In compression moulding of plastic objects by means of heated tools a new technique has recently been introduced, which, contrary to a previous method, consists in that the object is subjected to the complete compression moulding pressure during the time the mould is closed. In practice this object is attained by the press movement being stopped at a preselected position. In said position the press platen (and the movable part of the mould) is forced into an exactly parallel position relative the stationary part of the mould, at the same time as the press material is forced to flow and completely fill the mould tool.

This position should be maintained during a predetermined time so that the curing of the material is initiated and the material begins to shrink. When the curing has reached a stage (gelation) but is still not terminated, the mould parts are again set in movement to each other and the object is completely subjected to the moulding pressure.

In order to stop the movable part of the mould at a position, which is sufficiently accurately defined in a vertical direction, and at the same time attain complete parallelism between the parts of the mould and consequently an even thickness of material of the object to be compression moulded, it is previously known to use a compression moulding press, wherein one of the two press platens at the side thereof directed towards the other platen presents hydraulic cylinders, wherein pistons are movable substantially perpendicularly to the platens. Said pistons determine the spacing between the platens in cooperation with stationary abutments on the second platen. In this prior device said predetermined position is further defined by a first predetermined piston position, to which the outwardly motion of the pistons is limited in a direction out of the cylinders.

Said device has provided to operate satisfactorily in practice. However, certain problems may occur in separating the parts of the moulds from each other after a completed compression moulding operation.

The object of the present invention has been to improve the press platen described above and provide means facilitating the separation of the parts of the moulds.

According to the present invention this object has been achieved by introducing means for allowing and causing movement outwardly of the pistons beyond said first piston position after the termination of the press operation.

By means of the invention it is attained that a return pressure is applied to the moulding tool, so that the parts of the mould can be separated from each other.

One embodiment of the present invention will now be described more closely below with reference to the accompanying drawings, on which FIG. 1 is a schematic side view partly in section, of a compression moulding press according to the invention and FIGS. 2a – c at an enlarged scale illustrate the method of operation of the part shown within the circle II in FIG. 1.

2 and 4 indicate the upper and lower press platen, respectively, of a compression moulding press for the compression moulding of plastic objects. The upper press platen 2 is operated in a vertical direction by means of a conventional hydraulic piston, generally indicated 6 and not described more closely. 8 and 10 indicate the two parts of a mould for compression moulding an object 12, said two parts being connected with one each of the press platens 2 and 4, respectively. At each corner of the lower platen 4 a hydraulic cylinder 14 is provided. The hydraulic cylinders 14 occupy an accurately defined position relative the press platen 4. In each hydraulic cylinder 14 a piston 16 is movable perpendicularly relative the surface of the platen 4. The spaces in the cylinders 14 located below the corresponding piston 16 are connected via a conduit 17 illustrated in FIG. 2 with a common supply conduit (not illustrated) for hydraulic liquid, through which conduit liquid under pressure can be fed to said cylinder spaces, as indicated by means of arrows 17'. Rigidly connected with the upper press platen 2 are vertical rods 18, the end surfaces of which form abutments located exactly opposite one each of the pistons 16, said abutments all being located in exactly the same horizontal plane. In the manner illustrated in FIG. 2 a pneumatic conduit 20 is further connected to a channel 22 in each of the pistons 16. The conduit 20 comprises members for the sensing the pressure in the conduit.

The arrangement described above agrees substantially with the device defined specifically in the Swedish Pat. No. 338,664 and will thus not be described more closely here.

The cylinders 14 are sealingly closed by means of cylinder covers 24, through which corresponding pistons 16 are sealingly slideable. Each piston 16 presents a piston head 26 at the end thereof located in the cylinder, said piston head being slideable in a corresponding cylinder bore 28, which forms the space described above to which hydraulic liquid is supplied via the channel 17. The cylinder bore 28 is terminated in the cylinder 14 by a shoulder 30, which merges into a second cylinder bore 32 with a larger diameter extending up to the cylinder cover 24. Around the smaller portion of the piston 16 or the piston rod a ring 34 is slideably arranged in the bore 32. The external mantle surface of the ring 34 thereby seals against the surface of the bore 32 and the internal mantle surface of the ring seals against the piston 16. To the upper part of the cylinder space defined by the cover 24, the bore 32 and the ring 34 there is connected a conduit, not illustrated in detail, through which hydraulic liquid can be supplied to said space via a channel 36, as indicated by means of an arrow 38. At the upper side thereof the ring 34 has a peripheral groove 40, which causes that always at least a smaller portion of the top side of ring 34 is adapted to be exposed to pressure via the channel 36.

FIGS. 2a–c are intended to illustrate the compression moulding process in operation of the apparatus according to FIG. 1. In order to further elucidate the process there is provided in each of said illustrations at the right hand side a section through a small portion of the two parts 8 and 10 of the mould and the moulding blank 12 so as to illustrate the positions of the parts of the mould corresponding to different positions of movement of the elements 16, 18 and 34.

At the beginning of a compression moulding process the top side of the ring 34 is exposed to pressure via the channel 36, so that the ring is resting on the shoulder 30 and the bottom side thereof forms a stationary abutment for the piston head 26. By means of the supply of hydraulic liquid at 17 the four pistons 16 are moved up into a first top position as defined by the ring 34. When the press platen 2 is moving downwards and the parts 8 and 10 of the mould are almost closed and the material 12 is flowing, the abutments as defined by the rods 18 are forced to land on the four piston ends. Since the height position of the pistons 16 is then accurately adjusted due to the abutment formed by the ring 34, the upper press platen 2 is forced to a parallel position relative the lower press platen 4, even if it has entered into a somewhat oblique position due to irregularities of the material during the flowing. The force due to the hydraulic pressure below the pistons must, of course, be higher than the force which is then required to adjust the press platen 2 to the right position and the pressure above the ring 34 must in turn be higher than the pressure acting from below. The fact that the press platen 2 has actually been adjusted into parallel with the press platen 4 can be sensed by the fact that air can no longer flow out through the channels 22, i.e., the pressure sensing members in the conduit 20 indicate an increase of pressure. In an automatic manner said increase of pressure can be caused to stop the compression moulding press the start a timing relay, not illustrated. When the time set by the timing relay has elapsed, a valve, not illustrated, which is located in the conduit to the cylinder space below the piston head 26, is opened so that the pressure at the bottom side of the pistons is vented, at the same time as the compression moulding press is started again and is now moving downwards the remaining short distance to contact with the press platen 2. This position is illustrated in FIG. 2b. The automatic equipment of the compression moulding press is such that the movement of the press platen 2 is stopped, if all the abutments defined by the end surfaces of the rods 18 have reached the top surfaces of the pistons 16, i.e., all four channels 22 are blocked. In practice, the distance of movement of the piston from the position of FIG. 2a to the position of FIG. 2b is very short.

After the compression moulding operation has been terminated the pressure over the ring 34 is vented via the channel 36, as indicated by means of the outwardly directed arrow 38 in FIG. 2c. Simultaneously a pressure is supplied below the piston head 26. The pistons 16 will then be capable of movement over a longer distance than previously due to the fact that the abutment formed by the ring 34 is now freely movable in the cylinder and presses upwardly on the rods 18, so that a return pressure is obtained on the upper part 8 of the tool. Said part can then be easily released from the compression moulded blank and the lower part 10 of the tool in the manner indicated at the right hand side of FIG. 2c. As is evident from the description above the ring 34 thus forms a movable abutment for the piston 16, 26, which allows for a longer distance of movement by the piston than has previously been possible.

I claim:

1. A compression moulding press of the kind wherein the object to be compression moulded is subjected to the total compression moulding pressure during the time during which the mould is closed, by first bringing the parts of the moulds, during the compression moulding process, to a standstill in a predetermined position, and after a predetermined time, when the curing has attained a certain state, bringing them again into contact with the compression moulding object, one of the two press platens operating the parts of the mould, at the side thereof directed towards the other platen presenting hydraulic cylinders, wherein pistons are movable substantially perpendicularly relative the platens, said pistons determining the distance between the platens in cooperation with stationary abutments on the second platen, and said predetermined position of the parts of the mould corresponding to a first predetermined piston position, to which the movement of the pistons outwardly of the cylinders is restricted, characterized by means for allowing and causing movement outwardly of the pistons beyond said first piston position, after the termination of the compression moulding operation.

2. A press as claimed in claim 1, characterized in that the position of the pistons is limited by an internal abutment, which is axially movable in the corresponding cylinder between a first abutting position, wherein it defines the first piston position, and a second, external abutting position, which defines a second piston position, to which the piston is movable outwardly beyond the first piston position.

3. A press as claimed in claim 2, characterized in that said internal abutment is formed by a surface on a ring, said surface being directed towards the interior of the corresponding cylinder, said ring slideably surrounding the piston and being axially movable in the cylinder between two positions, which are defined by internal shoulders in the cylinder.

4. A press as claimed in claim 3, characterized by the ring sealingly separating two cylinder spaces from each other, which are adapted to be connected to one source each of pressurized fluid.

* * * * *

UNITED STATES PATENT OFFICE
CERTIFICATE OF CORRECTION

Patent No. 3,799,720    Dated March 26, 1974

Inventor(s) Rune Axel Erik Fjellman

It is certified that error appears in the above-identified patent and that said Letters Patent are hereby corrected as shown below:

On the cover sheet insert

-- [30]  Foreign Application Priority Data

Sweden    11928/71    9-21-71    --.

Signed and sealed this 10th day of September 1974.

(SEAL)
Attest:

McCOY M. GIBSON, JR.
Attesting Officer

C. MARSHALL DANN
Commissioner of Patents